(12) United States Patent
Lester et al.

(10) Patent No.: US 9,659,111 B2
(45) Date of Patent: May 23, 2017

(54) METHOD FOR DESIGNING A MATERIAL PROCESSING SYSTEM

(71) Applicant: The Procter & Gamble Company, Cincinnati, OH (US)

(72) Inventors: Joseph Craig Lester, Liberty Township, OH (US); William R Myers, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 540 days.

(21) Appl. No.: 14/221,344

(22) Filed: Mar. 21, 2014

(65) Prior Publication Data
US 2015/0269283 A1 Sep. 24, 2015

(51) Int. Cl.
*G06F 17/50* (2006.01)
(52) U.S. Cl.
CPC .......... *G06F 17/50* (2013.01); *G06F 17/5009* (2013.01)
(58) Field of Classification Search
CPC ............................. G06F 17/50; G06F 17/5009
USPC ............................................................. 703/1
See application file for complete search history.

(56) References Cited

U.S. PATENT DOCUMENTS

| | | | | |
|---|---|---|---|---|
| 6,999,845 B2 * | 2/2006 | Hirai | .................. | G05B 19/4099 318/570 |
| 7,567,917 B2 * | 7/2009 | Miller | ................ | G06Q 10/0637 705/7.29 |
| 8,209,156 B2 * | 6/2012 | Grichnik | ................. | G06F 17/50 703/1 |
| 2009/0326892 A1 * | 12/2009 | Lin | ........................ | G05B 17/02 703/7 |
| 2013/0113825 A1 * | 5/2013 | Wine | ..................... | G09F 19/12 345/629 |
| 2014/0365180 A1 * | 12/2014 | Lam | .................... | G06F 17/5004 703/1 |

OTHER PUBLICATIONS

Zhou et al. "Surrogate Modeling of Multistage Assembly Processes Using Integrated Emulation", Journal of Mechanical Design, vol. 134, Jan. 2012, 10 pages.
Pohlak et al. "Multi-criteria optimization of large composite parts", article from Composite Structures, vol. 92, Issue 9, Aug. 2010, pp. 2146-2152.

* cited by examiner

*Primary Examiner* — Eunhee Kim
(74) *Attorney, Agent, or Firm* — David K Mattheis

(57) ABSTRACT

A method for designing a product processing apparatus. The method includes: providing a design of a product processing apparatus; providing a representation of the product processing apparatus; providing a representation of a product; providing a representation of a product package; simulating the interactions of any combination of the product, apparatus, and package as a set of transformations utilizing the product, apparatus, and/or package representations; creating a surrogate model for at least one transformation of the set utilizing the simulation results; evaluating the performance of the apparatus utilizing the set of surrogate models of the transformations; and altering the design of the apparatus according to the evaluation.

12 Claims, No Drawings

METHOD FOR DESIGNING A MATERIAL PROCESSING SYSTEM

FIELD OF THE INVENTION

The invention relates to methods for the design of material processing systems and components. The methods relate particularly to the design of products, packages, and product/package processing apparatus.

BACKGROUND OF THE INVENTION

Packages for providing products are well known as are apparatus for the processing of packages and products to provide finished goods for sale. Incremental improvements to such packages and apparatus may be accomplished by the creation of prototype systems configured for evaluating a particular concept thought to be better in some manner than existing system elements.

System complexities often result in unexpected consequences as aspects of system components are altered. Reducing the thickness and the associated strength of package components may result in unexpected efficiency losses due to operational failure in the packaging operations associated with the materials. Alterations to packaging apparatus may yield improvement in equipment cost but also result in net losses due to reductions in overall operating efficiency due to operating speed and/or reliability issues.

What is desired is a system and method for the evaluation of systems to assist in the creation of designs of materials, apparatus and system operating conditions, which offer stable, high reliability operation of the packing systems under truly economic circumstances.

What is also desired is a method for the evaluation of materials, packages and processing systems which cannot otherwise be considered.

SUMMARY OF THE INVENTION

In one aspect, a method for designing a product processing apparatus. The method includes: providing a design of a product processing apparatus; providing a representation of the product processing apparatus; providing a representation of a product; providing a representation of a product package; quantifying the interactions of any combination of the product, apparatus, and package as a set of transformations utilizing the product, apparatus, and/or package representations; creating a surrogate model for at least two transformations of the set utilizing the quantification results; evaluating the performance of the apparatus utilizing the set of surrogate models of the transformations; and altering the design of the apparatus according to the evaluation.

DETAILED DESCRIPTION OF THE INVENTION

The methods of the invention relate generally to the creation and refinement of designs for products, apparatus and packaging. The methods comprise steps associated with modeling the interaction of combinations of representations of packages, products and the environment associated with the product and package.

An initial design of one of the package, product, or environment is provided. The design may be a conceptual design which has yet to be reduced to a physical form, through to an actual design currently available for use, to any stage of development there between.

The product may be any consumer product ranging from web-type products-paper products, metal and polymeric films, etc., fluid products, beverages, cleaning and/or lubrication precuts, solid or gelatinous products, powders, pasts, gels etc. The product design may include the physical properties of the product such as viscosity, tensile strength, shear response, pH, electrical conductivity, etc., as applicable to the particular product type.

The package designs may include primary, secondary, or higher level packaging elements. The package design may include material properties associated with the particular materials of the package. Exemplary package materials include, paper and vary grades of materials derived from wood pulp, polymeric materials including, without limitation, polymeric films, injection molded elements, blow molded elements and other form of polymeric packaging as are known in the packaging arts. The package design may be for glass, ceramic, metal, or composite packages. The design may call for a combination of materials, or a combination of package levels such as the combination of the primary and secondary packages, together with the design of the pallet level combination and pallet unitizing elements.

The environment of the package and product may consist of the apparatus used for the production of the product, the processing of the product to dispose the product within the package, the processing of the packaged product and secondary packaging as well as other subsequent processing of the product package combination by the manufacturer or other processor of the product.

The environment may be broader than the processing of the product and packaging. The environment may include a representation of the factors and various conditions potentially impacting the product, and/or package, during the shipment from one location to a subsequent location. The environment may include the factors associated with the retail or wholesale environment of the product as well as the factors associated with the handling and use of the product and/or package by the consumer of the product. Exemplary environmental factors which may be associated with the consumer interaction with the product/package include the reaction of the package and product to environmental forces or load cases including load cases associated with dropping the package, opening the package and dispensing product from the package. The representation of the environment may include inputs associated with the mechanical stresses arising from the package environment due to contact or physical coupling with outside elements, as well as the environmental conditions including temperature, humidity, etc. The representation of the environment may be provided as a virtual, physical, or hybrid representation. The virtual representation may be the result of a first principles description of the environment and/or environmental factors. A physical representation of the environment and/or environmental factors may be derived using data from measurements of actual environments and actual environmental factors.

The representation of the product, package and environment may be physical or virtual. Physical representations may be derived from data acquired by measuring actual physical systems and products. Virtual representations may be derived using a first principles description of the elements. Hybrid representations, derived utilizing first principles descriptions refined utilizing data from actual measurements may also be provided. The representations of the product, package and environment may be in the form as a table for use by finite element analysis or fluid-structure interaction software. The provided information may include:

material modulus in each of a machine direction and cross-direction, material coefficient of friction, element motion profiles associating the position of the element to a timeline, material thickness, density, geometry—via a CAD (computer aided design) digital file, together with combinations of these factors. Product representations may include, pH, density, viscosity, including viscosity as a function of shear forces, and combinations of these factors.

The provided representations are evaluated in combination with each other. Exemplary combinations include—product/package, package/environment, product/package/environment. The combinations may be associated with the various and respective transformation which occur over the lifetime of the product and package. Exemplary transformations include, material transfer of the product from one portion of the product processing system to a subsequent portion of that system, filling the primary package with the product, processing the package, including closing, labeling and packaging the package, placing a primary package within a secondary package, stacking packages to create a case or pallet sized load, unitizing a pallet sized load, shipping cases and pallet sized loads, dropping the package, squeezing the package, dispensing the product from the package, combinations of these and so on.

The evaluation, or quantification of the various combinations may be accomplished by modeling or simulating the interactions of the virtual and/or hybrid representations, or by measuring the interaction of actual members of the combinations.

The modeling of the various transformations includes simulating the transformation using values for input parameters within established ranges for the particular parameters. Known space filling techniques, including: sphere packing, Latin hypercube, uniform spacing, minimum potential, maximum entropy, Gaussian Process IMSA, and other known space filling methods. The space filling method may be tailored to ensure a mapping of the parameter space over a particular region identified as being critical or otherwise of noted interest in characterizing the activity of the system.

Consideration of the various possible combinations at the various transformations, yields in a set of results, each result associated with a particular combination of representations. A surrogate model is created from each result leading a set of surrogate models associated with the product, package and environmental parameters used as the basis for the representations created to provide a description of each of these elements.

In one embodiment, computational efficiency may be improved by selecting only a portion of the total set of possible transformations for simulation and subsequent surrogate modeling. The selection may be based upon previous experience with the relative criticality of the respective transformations as they relate to the inputs and outputs of the system. The first principles representations of the system used as the basis of the simulations may also be used to inform the selection process. As an example, a term relating an output as a function of the cube of an input may be of greater interest than one relating the output as a linear function of the input or as unrelated to the input.

Each transformation may be prioritized using these methods and the selection may then proceed using the relative priorities as a guide to determining the extent to which particular transformations are considered and evaluated.

Surrogate models are a statistical tool used to simplify the characterization of the simulated transformation to reduce the resources required to achieve usable results. Surrogate models may be developed from the simulation results data via Gaussian processes, response surface techniques, neural networks and other statistical methods. The JMP statistics software, available from SAS of Cary, N.C., may be used to develop the surrogate models.

To the extent that a particular element is part of a set of combinations and is part of a set of transformations, and the associated surrogate models, the material properties associated with that element may be evaluated utilizing the set of surrogate models. As an example, a package may comprise a chipboard carton have a bending stiffness within a defined range. The set of surrogate models associated with transformations involving the package may be used to evaluate the performance of the package across the set of transformation. This evaluation may be used to identify particular values or ranges of values for the material properties of the package which associated with stability and/or reliability across the respective transformations as well as the entire set of transformations, or alternatively, to indicate values and/or ranges indicating unstable and/or unreliable values across individual of multiple transformations.

As the evaluations progresses, values of material properties associated with better transformation performance may be used to alter the design of the package.

In a similar manner, product property values may be evaluated to determine product response to the respective transformation as well as across the set of transformations and the resulting evaluation may be used to reformulate or otherwise alter the product. Environmental and apparatus factors may be considered to determine if there is a need for additional stabilizing elements during the processes associated with the complete lifecycle of the product, more or less material in the package in response to the package drop or product dispensing transformations, or to assist in the determination of stable packaging apparatus operational parameters according to the evaluation of parameter values across their respective ranges using the set of surrogate models developed and including the operational parameters of the packaging apparatus as inputs. The overall method may begin with and focus on the evaluation of the design of any of the product, package, or environment. Each of these may be considered in order to provide a comprehensive consideration of all possible parameters associated with the full lifecycle of a particular product.

The use of the set of surrogate models, describing a set of transformations having common input parameters yields results indicative of input parameter values which provide results defined as acceptable across multiple transformations, or at a minimum provides an indication of the performance to be expected across the set of transformations using particular input parameter values and potentially indicating transformations which may be altered to the overall benefit of the efficiency, reliability or other performance aspect of the set of transformations, the product's performance, the consumer's perception of the product or other aspect of the products lifecycle.

EXAMPLES

Evaluating the Packing of a Tube of Product in a Carton

Sealed tubes of product, such as toothpaste, hair products, medicinal products are well known. The provision of such tubed products within secondary cartons is also well known. The methods of the invention may be used to evaluate the performance of different materials and grades of materials as they may be processed in the various transformations of the overall process of filling and sealing a tube, and subsequently packaging a filled tube of material in a carton.

The process may be characterized as a series of transformations involving the tube, the carton and the product.

Exemplary transformations include: storing quantities of empty tubes, transferring tubes from storage, conveying tubes a staging area, picking and placing the tubes from staging to tube conveying elements, conveying the tubes, up-righting the tubes, placing the tube into a puck, transferring the tube/puck combination to a next unit operation, seating the tube in the puck, inspecting, cleaning, orienting, filling, sealing, and trimming the tube, removing the tube from the puck, picking the tube and placing it into a bucket of a carton loader, storing the cartons, staging the cartons, erecting a carton, inserting the tube into the erected carton, tucking the minor carton flaps, applying adhesive, tucking the major carton flaps, conveying the closed carton, stacking the cartons, bundling stacked cartons, moving the bundles, loading the bundles into a case, conveying the case, palletizing the cases, unitizing the palletized cases, and storing and shipping the unitized pallet. Additional transformations associated with the case may also be considered.

The complete set of transformations may be prioritized according to the material parameters of particular interest since some transformations are more critically affected or more sensitive to changes in certain material parameter values. As a simple example, many carton material properties are not critical to the transformation of applying glue to a cartons sealing surfaces. Transformations which are highly sensitive to particular parameters may be identified as being of the highest priority and may be simulated whereas transformation which are relatively independent of the material properties may not be simulated.

The transfer of the tube and puck combination may be identified as significant and may be simulated. The simulation may take factors including: tube deflection during the transfer, tube mass, peak acceleration, tube flexural modulus, tube thickness, outside beam radius, area moment of inertia, and the length from the center of mass to the top of the tube holder, into consideration as levers that may affect the result. Other transformations involving the tube may also be simulated using parameters included above.

The results of the respective tube transformations may be used as the input for the creation of transformation specific surrogate models of the associations mapped using the simulations.

The set of surrogate models enables the evaluation of the parameters across multiple transformations. The impact of varying tube stiffness, may for example be evaluated across all tube transformations to determine if there is a value, or range of values, having superior or problematic performance issues in one or more of the transformations.

Each of the input parameters may be evaluated in this manner resulting in the defining of a set of parameter values identified as resulting in desirable outcomes or as values to be avoided.

The set of values may form the basis for the selection of materials, the design of packaging elements, and/or the design or modification of the environment, including the apparatus, and the storage and shipping aspects of the environment. The parameters may further be used to identify what is necessary for a particular consumer use experience to the extent that the aspect of consumer use under consideration is functionally associated with one or more of the levers under evaluation in the transformations.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for designing a product processing apparatus, the method comprising:
    a. Providing a design of a product processing apparatus;
    b. providing a representation of the product processing apparatus;
    c. providing a representation of a product;
    d. providing a representation of a product package;
    e. quantifying the interactions of combinations of the product, apparatus, and package as a set of transformations utilizing the product, apparatus, and/or package representations;
    f. creating a surrogate model for each of at least two transformations of the set utilizing the quantification results;
    g. evaluating the performance of the apparatus utilizing the set of surrogate models of the transformations;
    h. altering the design of the apparatus according to the evaluation.

2. The method according to claim 1, wherein at least one representation comprises a virtual representation.

3. The method according to claim 1 wherein at least one representation comprises a physical representation.

4. The method according to claim 1 wherein at least one representation comprises a combination of physical and virtual representations.

5. A method for designing a product, the method comprising:
    a. Providing a specification for a product;
    b. providing a representation of a product environment;
    c. providing a representation of the product according to the product specification;
    d. providing a representation of a product package;
    e. quantifying the interactions of combinations of the product, environment, and package as a set of transformations utilizing the representations of the product, environment, and package;
    f. creating a surrogate model for each of at least two transformations of the set utilizing the quantification results;

g. evaluating the performance of the product utilizing the set of surrogate models of the transformations;

h. altering the specification of the product according to the evaluation.

6. The method according to claim 5, wherein at least one representation comprises a virtual representation.

7. The method according to claim 5 wherein at least one representation comprises a physical representation.

8. The method according to claim 5 wherein at least one representation comprises a combination of physical and virtual representations.

9. A method for designing a product package, the method comprising:
   a. Providing a design of a product package;
   b. providing a virtual representation of a package environment;
   c. providing a virtual representation of a product;
   d. providing a virtual representation of the product package;
   e. simulating the interactions of combinations of the product, environment, and package as a set of transformations utilizing the product, apparatus, and package virtual representations;
   f. creating a surrogate model for each of at least two transformations of the set utilizing the simulation results;
   g. evaluating the performance of the package utilizing the set of surrogate models of the transformations;
   h. altering the design of the package according to the evaluation.

10. The method according to claim 9, wherein at least one representation comprises a virtual representation.

11. The method according to claim 9 wherein at least one representation comprises a physical representation.

12. The method according to claim 9 wherein at least one representation comprises a combination of physical and virtual representations.

\* \* \* \* \*